United States Patent Office 2,876,225
Patented Mar. 3, 1959

2,876,225

MANUFACTURE OF THERAPEUTIC SUBSTANCES

George H. Donnison, South Wellfield, Whitley Bay, Northumberland, England, assignor to Abbott Laboratories, Chicago, Ill., a corporation of Illinois No Drawing. Application June 13, 1956
Serial No. 591,024

Claims priority, application Great Britain June 15, 1955

14 Claims. (Cl. 260—257)

This invention relates to the manufacture of useful chemical substances and more particularly to the manufacture of therapeutically useful thiobarbituric acids.

Thiobarbituric acids having the general formula:

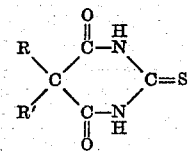

wherein R and R' are hydrogen or saturated or unsaturated alkyl, cycloalkyl, cycloalkylene, or aryl groups, and S is sulfur, and the salts thereof, are known to have useful therapeutic properties. These compounds, wherein R and R' have 2 to 6 carbon atoms, are particularly effective as hypnotics, sedatives, and anesthetics.

One important use of the thiobarbituric compounds of the latter type is for inducing surgical anesthesia of relatively short duration, and for such use dilute aqueous solutions are injected parenterally in relatively large amounts. It should therefore be appreciated that the purity of these compounds is very important.

Heretofore, the method most generally used for preparing these thiobarbituric acid compounds has been to condense one molecular equivalent of a di-substituted malonic ester with one or more molecular equivalents of urea or thiourea in the presence of sodium ethylate. The solvent generally used for the foregoing reaction is an alcohol or a hydrocarbon solvent. A reaction temperature of from about 90° C. to 120° C. is maintained for about 18 hours. The barbituric acid formed is isolated from the reaction mixture in an impure form by precipitating the said acid from an aqueous solution thereof by the addition of a mineral acid. Further purification must be effected by dissolving the barbituric acid in alkali and reprecipitating by the addition of acid. The product must then be recrystallized from alcohol, benzene, or other suitable solvent. The foregoing reaction requires considerable time and the resulting product is consequently relatively expensive.

It is therefore an object of the present invention to provide an improved process for the preparation of thiobarbituric acid compounds, including the thiobarbituric acids, wherein the overall time required to prepare a highly purified product is substantially reduced.

It is a further object of the present invention to provide an improved process of producing more economically a thiobarbituric acid compound having the required high degree of purity.

It is still another object of the present invention to provide an improved process of producing thiobarbituric acids, wherein increased yields of a highly purified product are obtained in a more economical manner.

Other objects of the present invention will be apparent from the detailed description and claims to follow.

According to the present invention, the herein disclosed new process of manufacturing barbituric acids is broadly characterized by condensing a di-substituted malonic ester having the general formula:

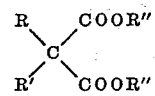

wherein R and R' are hydrogen or saturated or unsaturated alkyl, cycloalkyl, cycloalkylene, or aryl groups, and R" is a lower alkyl group with an active metallo derivative of a carbamide selected from the group consisting of urea, N-lower alkyl urea, thiourea, and N-lower alkyl thiourea, such as is formed when the said urea or thiourea is reacted with alkali or alkaline earth metal alcoholate, sodium hydride or the like alkali or alkaline earth metallating compound, said metallo derivative being formed in the presence of the said malonic ester or apart therefrom, and wherein the said condensation reaction is carried out at such temperatures and pressure as to preclude decomposition, other than a negligible decomposition, of the thiobarbituric acid compounds formed. By carrying out the reaction at a temperature and under conditions which preclude decomposition taking place during the condensation reaction, a more highly purified product is obtained directly and the subsequent steps of preparing the pure acid and/or a water soluble salt thereof are greatly simplified, since several of the time consuming purification steps heretofore considered essential are eliminated.

The condensation reaction between the di-substituted malonic ester compound and the urea or thiourea compound is preferably carried out at atmospheric pressure in which case the temperature of the reaction should not exceed about 60° C. Experiments carried out have shown that in the condensation reactions with a thiourea compound and a di-substituted malonic ester to form the desired thiobarbituric acid, the condensation reaction proceeds very effectively when the reaction is carried out at a temperature between about 55° C. and 60° C., at atmospheric pressure and for a period of between about 12 to 24 hours. For best results in the commercial preparation of a thiobarbituric acid, however, such as 5-ethyl-5-(1-methylbutyl)-2-thiobarbituric acid, the temperature during the condensation reaction should not exceed 55° C. and for a period of about 18 to 24 hours at atmospheric pressure. Very high purity 5-ethyl-5-(1-methylbutyl)-2-thiobarbituric acid is also produced when the herein disclosed condensation reaction is carried out at a temperature of about 35° C. for a period of 65 hours at atmospheric pressure.

In order that the invention may be more clearly understood, the following examples are included by way of illustrating the process.

Example I

Clean sodium metal (282 gms.) is gradually added to a volume of methanol in excess of the theoretical volume required to dissolve the sodium in order to provide a solution of sodium methylate in methanol. A suitable volume of methanol has been found to be 2700 cc. The solution obtained is cooled to 60° C. and the temperature of the solution maintained within the range of 55–60° C., while thiourea, which has been thoroughly dried, is added. The amount of thiourea added to the solution is in excess of the theoretical amount necessary to react with the malonic ester so as to cause the reaction to go to completion. Experiments have shown that a suitable amount of thiourea to be added to the methylate solution is 408 gms.

After the thiourea has dissolved, 900 gms. of diethyl ethyl-(1-methylbutyl) malonate ester are added to the reaction mixture. The reaction mixture is very carefully kept at a temperature within the range 55–60° C. for 24 hours, at the end of which period the condensation reaction is found to be complete, which can be empirically tested by taking a small sample of the reaction mixture and pouring it into two volumes of water. The absence of any unreacted ester floating on the surface is indicative of the completion of the reaction.

The reaction mixture is then cooled to 20° C. and poured into 5½ liters of water. As there is an excess of sodium methylate present in the reaction mixture, it is desirable to cool the reaction mixture at this stage, since, under the alkaline conditions, hydrolysis of the synthesized crude sodium 5-ethyl-5-(1-methylbutyl)-2-thiobarbiturate would rapidly occur if the temperature were too high.

Accordingly, in the process described it is essential to precipitate the barbituric acid as quickly as possible, since the yield would drop by as much as 3% in 24 hours under the alkaline conditions employed. The aqueous mixture is treated as quickly as possible with activated carbon and filtered through a suitable filter. When the filtration is complete, water is pumped through the filter and added to the batch until the filtrate no longer gives a precipitate with acetic acid.

The acid, 5 - ethyl - 5 - (1 - methylbutyl) - 2 - thiobarbituric acid, is precipitated by the careful addition of acetic acid (80% technical) until the mixture is acid to litmus. The thiobarbituric acid is then filtered off, washed well with water and then distilled water to remove sodium acetate, and dried in an air drier at 90° C.

The yield of thiobarbituric acid obtained is 730 gms. or 0.81 gm. of acid per gm. of diethyl ethyl-(1-methylbutyl) malonate employed, i. e., physical yield of 81%, (93.7% of the theoretical yield). The melting point of the product was found to be 156–157° C. (uncorrected).

Evolution of hydrogen sulfide during the precipitation of the acid, which was a source of trouble with the usual known method of preparation, is virtually eliminated in the present process.

*Example II*

A cool dry still is charged with 545 kg. of methanol having a moisture content of 0.025% or below and the still is evacuated and thoroughly purged with nitrogen. Clean sodium is slowly added to the methanol and additional sodium is added to maintain refluxing of the methanol until a total of 71.8 kg. of sodium has been added and completely dissolved in the methanol. The sodium methylate solution thus formed is cooled to 55° C. and 102.2 kg. of thiourea which has been thoroughly dried at 75° C. is then added to the methylate solution. To the latter metallated thiourea solution at a temperature of 55° C. is added 227 kg. of diethyl ethyl-(1-methylbutyl) malonate and the temperature during the latter condensation reaction is maintained at between about 50 and 55° C. for 24 hours. At no time during condensation is the temperature of the reaction allowed to exceed 55° C. When the condensation is completed, the reaction mixture is cooled to 20° C. and diluted with 400 gallons of cold water, and 5 kg. of activated carbon and 5 kg. of filter aid are added and the mixture stirred. The reaction mixture is then filtered rapidly and water is passed through the filter and added to the reaction mixture until the discharge from the filter no longer forms a precipitate with acetic acid. The clear filtrate is then precipitated by the addition of acetic acid (80% technical) until the mass remains acidic to litmus. The precipitated acid is then separated from the liquid by centrifugation until substantially free of liquid. The centrifuged acid is then slurried with about 500 gallons of water and recentrifuged. The washed centrifuged acid is then removed from the centrifuge and granulated and thereafter dried in a hot air drier at a temperature of 90° C. The product, 5-ethyl-5-(1-methylbutyl)-2-thiobarbituric acid, has a melting point of 156–157° C. and forms a clear solution in cold alcohol when added in a concentration of 10% to the said alcohol. A yield of about 81% (physical yield) of the said acid is obtained.

In order to minimize occlusion of sodium acetate during the subsequent precipitation of the thiobarbituric acid, the excess methanol in the condensation reaction may be removed in whole or in part by distillation in vacuo during the condensation reaction while maintaining the reaction temperature at between 55 and 60° C. The following example illustrates the foregoing modification.

*Example III*

Into a 500-gallon glass-lined still is charged 1625 lbs. of methanol. The still is purged with nitrogen and charged with 157.3 lbs. of sodium metal at a rate which is sufficient to maintain constant reflux conditions. The still is maintained at reflux condition until all the sodium has dissolved in the methanol. Thereafter, the alcohol solution of sodium methylate is cooled to 60° C. and 225 lbs. of thoroughly dried thiourea is added while maintaining a nitrogen atmosphere within the still. The mixture is thoroughly agitated to dissolve the thiourea and thereafter 500 lbs. of dry diethyl ethyl-(1-methylbutyl) malonate is added. The condensation reaction mixture is held at a temperature of 55° C. for 9 hours at which time a vacuum is applied to distill off methanol while maintaining the temperature at 55° C. Over a period of 9 hours, approximately 165–190 gallons of methanol are removed while maintaining the temperature at 55° C.

The viscous reaction mixture is then poured into two 300-gallon stainless steel tanks, each containing about 150 gallons (U. S.) of 50% ice and water. The mixture is agitated until uniformly dispersed and thereafter 7 gallons of benzene are added to each tank. After standing for about 15 minutes following agitation, the benzene layer is separated and discarded. The aqueous solution is mixed with 10 lbs. of activated carbon and 8 lbs. of a suitable filter aid. After agitation, the mixture is filtered through a Sparkler filter into a 750-gallon glass-lined vessel equipped with an efficient agitator. Thereafter, 80% acetic acid is slowly added to the filtered solution with agitation until a pH of between about 7.0 and 7.5 is maintained. The precipitate which forms is then centrifuged and the product is washed and continuously centrifuged for 40 minutes with water at full line pressure. The centrifuged product is then air dried at 95–100° C. for about two days to yield 400 lbs. of 5-ethyl-5-(1-methylbutyl)-2-thiobarbituric acid having a melting point of 156–157° C.

*Example IV*

In 450 cc. of methanol is added 47 gms. of sodium metal and the mixture allowed to completely react to form a methanol solution of sodium methoxide. The methanol solution of sodium methoxide is then cooled to 60° C. and 68 gms. of thiourea which has been thoroughly dried is added with stirring until a uniform solution is formed. Thereafter, 157 gms. of diethyl allyl-(1-methylbutyl) malonate is added to the solution of the sodio derivative of thiourea at a temperature of 55° C. and the condensation reaction mixture maintained at the said temperature for 24 hours. Methyl alcohol is removed under vacuum during the course of the reaction while maintaining a temperature of 55° C. The viscous reaction mixture is then poured into 1.5 liters of ice water and agitated to form a uniform solution. The solution is treated with activated carbon and filtered. Thereafter, 80% acetic acid is added until the filtered solution remains acidic to litmus. The precipitate formed is filtered and washed thoroughly with distilled water.

The product is air-dried at a temperature of 95–100° C. for 48 hours to yield 133 gms. of 5-allyl-5-(1-methylbutyl)-2-thiobarbituric acid having a melting point of 132–133° C. and assaying at 99.5% pure.

*Example V*

Sodium methylate (16.4 gms.), thiourea (12 gms.), and diethyl diethylmalonate (21 gms.) are added to 25 ml. of ethylene diamine. The mixture is maintained at a temperature of 60° C. for 16 hours and after cooling is poured into 100 ml. of water. Acetic acid is added to precipitate the product, 5,5'-diethyl-2-thiobarbituric acid, which after filtering, washing with water, and drying at about 100° C. yields 9.2 gms. of the said product having a melting point of 173° C.

Parenteral solutions of the sodium salts of the above thiobarbituric acids prepared in the foregoing specific examples are particularly useful as anesthetics. The sodium salts of the said barbituric acids are readily prepared by treating the said barbituric acids with alkali metal hydroxides or other alkali metal compounds. For example, the sodium salt of 5-ethyl-5-(1-methylbutyl)-2-thiobarbituric acid is conveniently prepared by dissolving one molecular equivalent of 5-ethyl-5-(1-methylbutyl)-2-thiobarbituric acid in warm absolute alcohol. The alcohol solution of the thiobarbituric acid is then added to a solution of one molecular equivalent of sodium ethylate in absolute alcohol. Upon evaporation of the alcohol, the sodium salt of 5-ethyl-5-(1-methylbutyl)-2-thiobarbituric acid separates as a crystalline solid which is readily soluble in water. The latter salt is conveniently administered in the usual manner as a 2½ or 5% aqueous solution which is adjusted to have a pH of about 11, in accordance with the standard practice.

In the manufacture of barbituric acids in accordance with the present invention, other polar solvents can be employed in addition to methanol. Thus, ethanol, isopropanol, and similar polar solvents can be substituted. In the preparation of the herein disclosed barbituric acids, however, it is preferable to employ methanol. Other non-volatile solvents which can be used in the process of the present invention are ethylene diamine and dimethylformamide.

In preparing the metallo derivatives of urea and thiourea compounds, metallo compounds other than the alkali and alkaline earth metal alcoholate can be used in the reaction between urea or thiourea to form the metallo compound. Thus, sodium hydride, sodium cyanamide, and sodamide can be used in place of the sodium methoxide or sodium ethoxide.

It will also be understood that other lower alkyl malonic esters can be used in addition to the diethyl malonic esters used in the several specific examples. Thus, in some instances it will be desirable to use a dimethyl malonic ester and in other instances a dibutyl malonic ester, as those skilled in the art appreciate.

Although the present invention has been described with particular emphasis being given to the preparation of 5-ethyl-5-(1-methylbutyl)-2-thiobarbituric acid and the sodium salt thereof, it will be understood that the present process is applicable to the preparation of all thiobarbituric acids and salts thereof, since the condensation reaction between the thiourea compound and the substituted malonic ester is substantially independent of the substituents on the malonic ester, simply by substituting an appropriate malonic ester, such as allyl-(2-cyclohexenyl)-diethyl malonate, for the ethyl-(1-methylbutyl)-diethyl malonate employed in Examples I–III. It should also be understood that the N-methyl thiobarbituric acids, such as 1-methyl-5-ethyl-5-(1'-methylbutyl)-thiobarbituric acid and 1 - methyl - 5 - allyl-5-(1'-methylbutyl)-thiobarbituric acid, can be prepared by using the appropriate N-methyl substituted malonic ester.

It will be evident from the foregoing that the present invention provides a process which produces a highly purified thiobarbituric acid with only one precipitation of the barbituric acid from the condensation reaction mixture, whereas previously it was necessary to dissolve the crude salt in cold water and precipitate with a mineral acid, such as hydrochloric acid and thereafter further purifying the crude acid by dissolving the first precipitate in dilute aqueous alkali and reprecipitating with a dilute acid or carbon dioxide and recrystallization. It will be evident that by eliminating the several reprecipitation steps necessary to obtain a product having the desired purity, the present process produces a higher yield of a highly purified product in a shorter overall elapsed processing time which thereby results in a much more economical method of manufacturing thiobarbituric acids.

Others may readily adapt the invention for use under various conditions of service, by employing one or more of the novel features disclosed or equivalents thereof. As at present advised with respect to the apparent scope of my invention, I desire to claim the following subject matter.

1. A process of preparing a barbituric acid having the general formula:

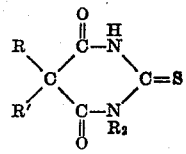

wherein R and R' are selected from the group consisting of hydrogen, lower alkyl, lower alkylene, cyclohexenyl, and phenyl groups, $R_2$ is selected from the group consisting of hydrogen and a lower alkyl and S is sulfur which comprises, condensing a di-substituted malonic ester having the general formula:

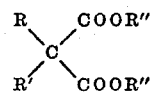

wherein R and R' have the above designated values and R" is a lower alkyl group with a metallo derivative of a compound selected from the group consisting of thiourea, and N-lower alkyl thiourea, said condensation being carried out at a temperature of between 35° and 60° C. at atmospheric pressure which precludes decomposition of the said barbituric acid, and recovering the free acid in a highly purified form without requiring recrystallization from an organic solvent solution.

2. A process according to claim 1 characterized by the said metallo derivative being an alkali metal derivative which is formed by reacting the said urea compound with a compound selected from the group consisting of an alkali metal alcoholate, an alkali metal hydride, an alkali metal cyanamide, and an alkali metal amide.

3. A process according to claim 1 characterized by carrying out the said condensation reaction in the presence of an alkali metal alcoholate and an excess of the said urea compound.

4. A process according to claim 3 characterized by removing from the said condensation reaction mixture the alcohol formed during the said condensation reaction.

5. A process according to claim 1 characterized by condensing a di-substituted malonic ester with a thiourea in the presence of an alkali metal alcoholate reagent at a temperature of about 55° C.

6. A process according to claim 5 characterized by employing sodium methylate in methanol as the alkali metal alcoholate reagent.

7. A processs according to claim 6 characterized by removing from the said condensation reaction mixture the methanol formed during the said condensation reaction.

8. A process according to claim 1 characterized by acidifying the reaction mixture which has been diluted with at least an equal volume of water by the addition of a dilute acid to precipitate the said barbituric acid.

9. A process according to claim 8 characterized by acidifying the said dilute aqueous reaction mixture with acetic acid.

10. A process according to claim 1 characterized by condensing diethyl ethyl-(1-methylbutyl) malonate with a thiourea.

11. A process according to claim 1 characterized by condensing diethyl allyl-(1-methylbutyl) malonate with a thiourea.

12. A process according to claim 1 characterized by condensing diethyl diethylmalonate with a thiourea.

13. A process according to claim 1 characterized by condensing diethyl allyl-(2-cyclohexenyl) malonate with a thiourea.

14. A process according to claim 1 characterized by condensing diethyl ethyl-(1-methylbutyl) malonate with thiourea in the presence of sodium methylate.

References Cited in the file of this patent

UNITED STATES PATENTS 2,621,183     Van Heyningen _____ Dec. 9, 1952

OTHER REFERENCES

Dox et al.: J. Am. Chem. Soc., vol. 43, 677–685 (1921).

UNITED STATES PATENT OFFICE

CERTIFICATE OF CORRECTION

Patent No. 2,876,225                          March 3, 1959

George H. Donnison

It is hereby certified that error appears in the printed specification of the above numbered patent requiring correction and that the said Letters Patent should read as corrected below.

Column 6, line 31, after "lower alkylene," insert -- cyclohexyl, --.

Signed and sealed this 14th day of July 1959.

(SEAL)
Attest:

KARL H. AXLINE
Attesting Officer

ROBERT C. WATSON
Commissioner of Patents